No. 844,487. PATENTED FEB. 19, 1907.
R. WATT.
COMBINED STEAM GENERATOR AND RADIATOR.
APPLICATION FILED JUNE 4, 1903.
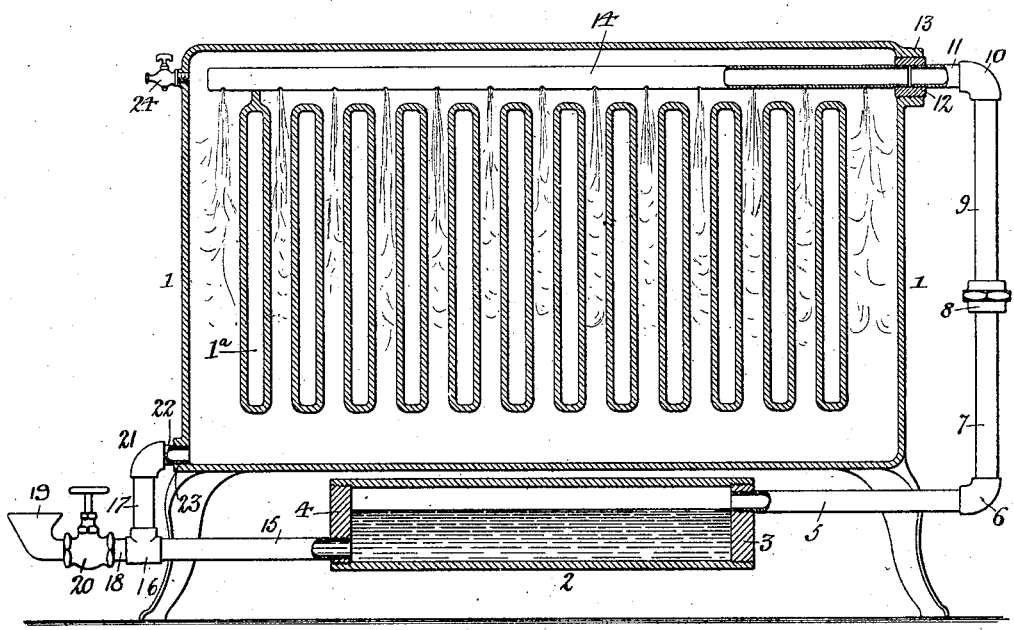
Witnesses:—
Hamilton D. Turner
Herman E. Metius.
Inventor:—
Robert Watt,
by his Attorneys;
Howson & Howson

UNITED STATES PATENT OFFICE.

ROBERT WATT, OF PHILADELPHIA, PENNSYLVANIA.

COMBINED STEAM GENERATOR AND RADIATOR.

No. 844,487.         Specification of Letters Patent.         Patented Feb. 19, 1907.

Application filed June 4, 1903. Serial No. 160,113.

*To all whom it may concern:*

Be it known that I, ROBERT WATT, a citizen of the United States, residing in Philadelphia, Pennsylvania, have invented certain Improvements in Combined Steam Generators and Radiators, of which the following is a specification.

The object of my invention is to so construct a combined steam generator and radiator as to reduce the cost of the same and provide for the introduction of steam into the radiator-sections in such manner as to prevent any interference with the inflow of steam by water of condensation.

The accompanying drawing represents, partly in vertical section and partly in elevation, a combined steam generator and radiator constructed in accordance with my invention.

1 represents a radiator-casing, and 2 the generator therefor, the latter being disposed beneath the radiator-casing and consisting, by preference, of a simple tube with plugs 3 and 4 for closing its opposite ends. Said radiator-casing is made with transverse conduits 1ª, forming passages which permit of the free flow of air through them.

Screwed into the plug 3 is a short pipe-section 5, which is connected by an elbow 6 to a vertical pipe-section 7, and the latter is connected by a coupling 8 to an upper pipe-section 9, united by an elbow 10 to a short pipe-section 11, which screws into an internally-threaded opening in a sleeve 12, the latter being also externally threaded for being screwed into a boss 13, formed upon one end of the radiator-casing, near the top of the same.

Into the internally-threaded opening of the sleeve 12 is also screwed one end of a distributer-pipe 14, which extends longitudinally throughout the top chamber of the radiator and has in its under side a series of openings, one in line with each of the vertical sections of the radiator, so that the steam will be discharged downwardly from said distributer-pipe 14 directly and independently into the upper end of each of said sections.

The plug 4 of the generator-casing has screwed into it a return-pipe 15, which is connected by a T-coupling 16 to a pipe 17 and to a filling-pipe 18, the latter having a funnel 19 and a stop-valve 20.

The upper end of the pipe 17 is connected by an elbow 21 to a threaded nipple 22, which is screwed into a boss 23 at the end of the radiator-casing, close to the bottom of the same.

The generator 2 can be heated by means of a gas-flame, an oil-flame, an electric coil, or in any other convenient manner, the steam from the generator passing up into the distributing-pipe 14 and being thereby directed downwardly into each of the sections of the radiator. The exterior portions of the conduits 1ª within the casing serve as condensation-surfaces, coöperating with the distributing-pipe 14, so that the latent heat of the steam delivered by this latter is transferred to the air in said conduits, and thereby rendered available as sensible heat, the water of condensation returning by the pipe 15 and its connections to the generator, any waste being replenished by a fresh supply introduced at intervals through the filling-pipe 18, the top of the funnel 19 in said filling-pipe being at the same level as the desired level of water in the generator, so that flooding of the latter or of the radiator with water is impossible.

Outside of the radiator itself I employ only ordinary pipe and fittings. Hence the structure can be very quickly assembled and can be erected at less cost than one requiring special parts. The location of the distributing-pipe 14 at the top of the radiator effectually precludes any interference with the free escape of the steam therefrom by reason of the downwardly-flowing water of condensation, and while some of the features of my invention can be used without the top distribution-pipe the use of the latter is therefore preferred.

The radiator-casing is provided near the top with an air-valve 24, and it may also be provided with a safety-valve, if desired.

Having thus described my invention, I claim and desire to secure by Letters Patent—

The combination of a radiator-casing having top and bottom passages free from water-traps, and transverse air-conduits forming vertical passages within the casing connecting said top and bottom passages, with a generator, a steam-pipe leading therefrom to the top passage of the radiator-casing, a distributer-pipe in said top passage provided with openings placed to discharge jets of steam downwardly between the conduits into the vertical passages formed thereby, and a return-pipe leading from the lower passage of the radiator-casing to the generator, substantially as specified.

In testimony whereof I have signed my name to this specification in the presence of two subscribing witnesses.

ROBERT WATT.

Witnesses:
F. E. BECHTOLD,
JOS. H. KLEIN.